(12) United States Patent
Manchanda et al.

(10) Patent No.: US 11,978,104 B2
(45) Date of Patent: May 7, 2024

(54) VERIFYING ASSOCIATION BETWEEN PHYSICAL PRODUCTS AND IDENTIFIERS OF PHYSICAL PRODUCTS

(71) Applicant: Maplebear Inc., San Francisco, CA (US)

(72) Inventors: Saurav Manchanda, Seattle, WA (US); Min Xie, Santa Clara, CA (US); Gordon McCreight, Mountain View, CA (US); Jonathan Newman, Menlo Park, CA (US)

(73) Assignee: Maplebear Inc., San Francisco, CA (US)

( * ) Notice: Subject to any disclaimer, the term of this patent is extended or adjusted under 35 U.S.C. 154(b) by 85 days.

(21) Appl. No.: 17/894,839

(22) Filed: Aug. 24, 2022

(65) Prior Publication Data

US 2024/0070742 A1 Feb. 29, 2024

(51) Int. Cl.
*G06Q 30/0601* (2023.01)
*G06F 16/56* (2019.01)
(Continued)

(52) U.S. Cl.
CPC ......... *G06Q 30/0629* (2013.01); *G06F 16/56* (2019.01); *G06F 16/90344* (2019.01); (Continued)

(58) Field of Classification Search
None
See application file for complete search history.

(56) References Cited

U.S. PATENT DOCUMENTS

2011/0295722 A1\* 12/2011 Reisman ............ G06Q 30/0641
705/26.1
2018/0181288 A1\* 6/2018 Yu ........................... H04W 4/20
(Continued)

FOREIGN PATENT DOCUMENTS

WO WO-2021096564 A1 \* 5/2021 ............. G06N 20/00

OTHER PUBLICATIONS

Ortal et al "Similarity Measure for Product Attribute Estimation", Nov. 2020, IEEE Access, pp. 179075-179082 (Year: 2020).\*
(Continued)

*Primary Examiner* — Romain Jeanty
(74) *Attorney, Agent, or Firm* — Fenwick & West LLP

(57) ABSTRACT

A server receives a plurality of product data entries from a plurality of retailer computing systems. Each product data entry includes a product identifier uniquely identifying a corresponding physical product and descriptive data of the corresponding physical product. A subset of the plurality of product data entries having a same product identifier is determined. An embedding vector representative of a product data entry in the subset is pairwise compared with each of respective embedding vectors representative of other product data entries in the subset other than the product data entry to compute respective vector similarity metrics. A pooled semantic similarity metric for the product data entry based on the computed respective vector similarity metrics. It is determined whether the product data entry is an outlier in the subset based on the pooled semantic similarity metric. A notification is transmitted to a client device of a user based on the determination.

22 Claims, 6 Drawing Sheets

(51) Int. Cl.
*G06F 16/903* (2019.01)
*G06F 40/166* (2020.01)
*G06F 40/284* (2020.01)
*G06F 40/30* (2020.01)
*G06Q 30/0201* (2023.01)

(52) U.S. Cl.
CPC .......... *G06F 40/166* (2020.01); *G06F 40/284* (2020.01); *G06F 40/30* (2020.01); *G06Q 30/0201* (2013.01)

(56) References Cited

U.S. PATENT DOCUMENTS

| | | |
|---|---|---|
| 2020/0311145 A1 | 10/2020 | Li et al. |
| 2021/0097502 A1 | 4/2021 | Hilleli et al. |
| 2021/0232633 A1 | 7/2021 | Boteanu et al. |
| 2022/0156175 A1 | 5/2022 | Periyathambi et al. |
| 2022/0198544 A1 | 6/2022 | Feng et al. |
| 2023/0252544 A1* | 8/2023 | Merkulov .......... G06Q 30/0625 705/26.62 |

OTHER PUBLICATIONS

Nigam, P. et al. "Semantic Product Search," *25th ACM SIGKDD International Conference on Knowledge Discovery & Data Mining*, Jul. 2019, pp. 2876-2885.

PCT International Search Report and Written Opinion, PCT Application No. PCT/US2023/025219, dated Oct. 11, 2023, 14 pages.

Xie, Y. et al. "An Embedding-Based Grocery Search Model at Instacart," Sep. 12, 2022, 11 pages, Retrieved from the internet <URL:https://sigir-ecom.github.io/ecom22Papers/paper_8392.pdf>.

* cited by examiner

| RRC | Product Title | Product Attributes 415 | | | |
|---|---|---|---|---|---|
| 405 | 410 | Brand 415a | Size 415b | ••• | Quantity 415n |
| XYZ123456 | 36 pack of 12 oz Pepsi cans | | | | |
| XYZ123456 | pepsi 355 ml | Pepsi | | | 36 |
| XYZ123456 | coca cola | | 16 oz | | |

400

450a, 450b, 450c

VERIFYING ASSOCIATION BETWEEN PHYSICAL PRODUCTS AND IDENTIFIERS OF PHYSICAL PRODUCTS

BACKGROUND

Order delivery systems frequently receive large volumes of product data (e.g., inventory data) from many different third-party sources (e.g., different retailers, different stores or warehouses of the same retailer). The order delivery systems may be required to update and maintain integrity and accuracy of the product inventory data received from the multiple sources in real-time. In the received product inventory data, a given source (e.g., a given retailer having multiple stores or warehouses) may identify a particular product using a unique identifier (e.g., product identifier). In some cases, for example, different stores or warehouses of the same retailer may inadvertently associate more than one unique identifier with the same product. Receipt of such data from multiple sources (e.g., different stores of the retailer) may cause the order delivery system to generate inaccurate search results in response to search queries from users. Further, receipt of such data may cause the order delivery system to generate multiple product entries for the same product in a database leading to computational inefficiencies and wastage of network resources.

SUMMARY

This disclosure relates generally to verifying inventory data, and more specifically, to verifying that inventory data received from retailers correctly associates the same product identifiers for the same physical products.

This disclosure pertains to systems and methods for verifying that product inventory data received from multiple sources associates the same product identifiers for the same physical products. An online system may receive and store the product inventory data received from the different sources as product data entries in a product inventory database. Techniques disclosed herein may identify an outlier in a group (e.g., a subset) of data entries in the database that correspond to the same physical product. The outlier may correspond to a data entry in the database that is received from one of the different sources and that associates a product identifier with a given physical product that is different from a product identifier associated with the given physical product in one or more other data entries in the group. A combination of one or more metrics may be computed for each data entry in the group in order to determine whether the data entry is an outlier (i.e., the data entry incorrectly associates a product identifier to a physical product) in the group. The metrics may include a semantic similarity metric, a lexical similarity metric, a product attribute similarity metric, and a temporal locality metric.

The semantic similarity metric is computed by getting embeddings from descriptive data for each data entry in the group and pairwise comparing the embeddings with each of the other data entries in the group. The lexical similarity metric is computed by calculating custom edit distances representing the number of deletion and substitution operations required to convert a character string corresponding to a data entry in the group to each of the other data entries in the group. The product attribute similarity metric is computed by using attribute prediction models to predict attributes of the product for each data entry in the group based on, e.g., the descriptive data included in the data entry, and pairwise comparing each predicted attribute type of the data entry with the corresponding predicted attribute types of each of the other data entries in the group. And the temporal locality metric may be computed by comparing an update timestamp associated with the product data entry with respective update timestamps associated with the other product data entries in the group (e.g., an outlier in the group may be localized with respect to time because the error was subsequently corrected). Based on the computed metrics the system may determine whether the data entry (for which the metrics were computed) is an outlier in the group. And the system may perform various actions (e.g., notifying the source of the data entry) based on the determination. Identifying and removing the outlier from the group may also lead to the system generating more accurate search results in response to search queries from users, and the system preventing generation of multiple product entries for the same product in the database, thereby leading to increased computational efficiency and prevention of waste of network resources.

In one or more embodiments, a computer-implemented method is provided which includes a plurality of steps. In particular, the method includes a step of receiving, at a server, a plurality of product data entries from a plurality of retailer computing systems. Each product data entry comprising a product identifier uniquely identifying a corresponding physical product and descriptive data of the corresponding physical product. The method further includes a step of determining a subset of the plurality of product data entries having a same product identifier. The method further includes a step of pairwise comparing an embedding vector representative of a product data entry in the subset with each of respective embedding vectors representative of other product data entries in the subset other than the product data entry to compute respective vector similarity metrics between the embedding vector representative of the product data entry and each of the respective embedding vectors representative of the other product data entries. Still further, the method includes a step of determining a pooled semantic similarity metric for the product data entry based on the computed respective vector similarity metrics. Yet still further, the method includes a step of determining whether the product data entry is an outlier in the subset based on the pooled semantic similarity metric. And still further, the method includes a step of transmitting a notification to a client device of a user in response to determining that the product data entry is the outlier.

DETAILED DESCRIPTION

Figure 1:
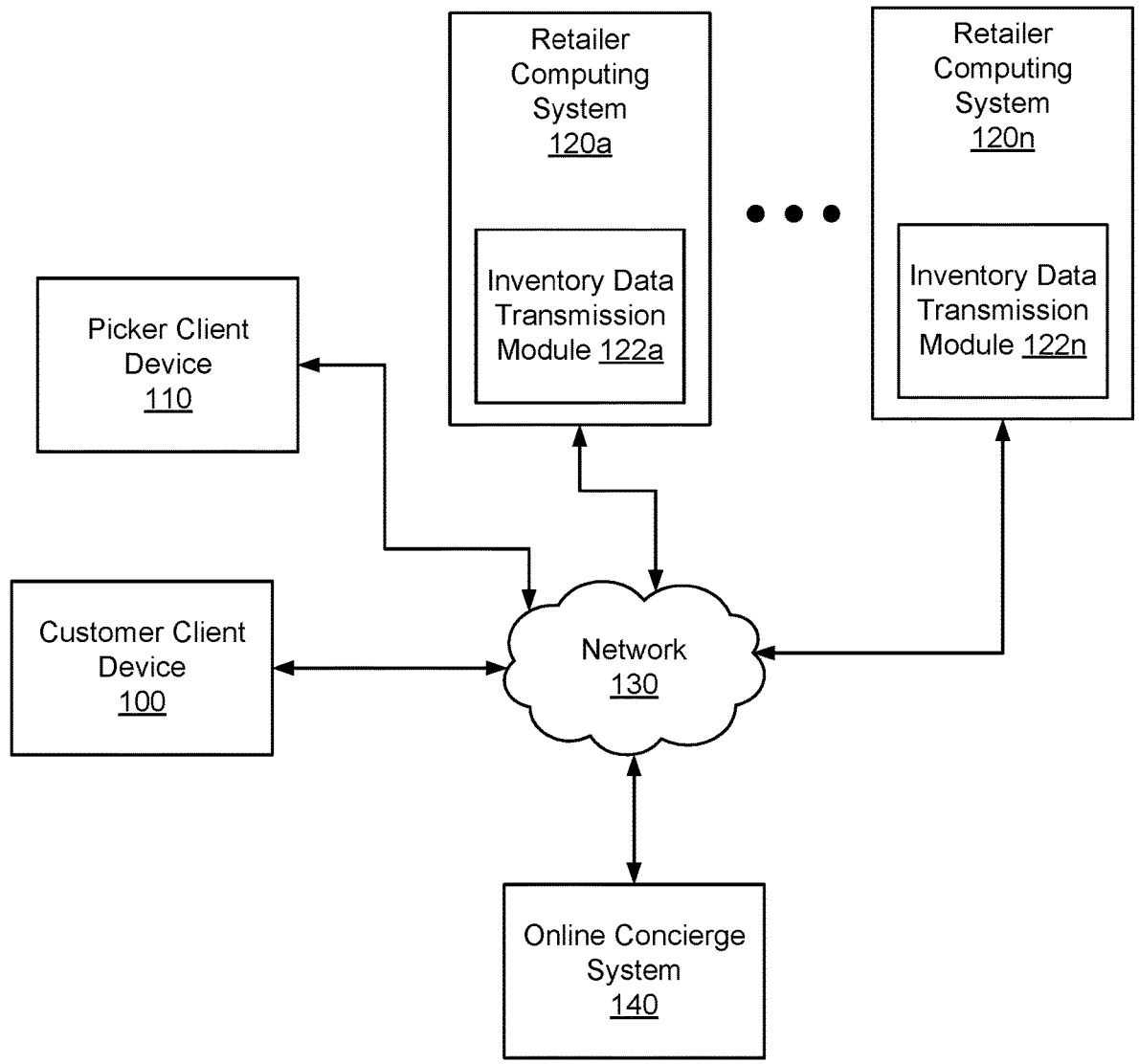
FIG. 1 illustrates an example system environment for an online concierge system, in accordance with one or more illustrative embodiments.

FIG. 1 illustrates an example system environment for an online concierge system 140, in accordance with one or more illustrative embodiments. The system environment illustrated in FIG. 1 includes a customer client device 100, a picker client device 110, a plurality of retailer computing systems 120 (e.g., 120a, . . . , 120n), a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers are all "users" of the online concierge system 140. Additionally, while one customer client device 100 and picker client device 110 are illustrated in FIG. 1, any number of customers and pickers may interact with the online concierge system 140. As such, there may be more than one customer client device 100, or picker client device 110.

The customer client device 100 is a client device through which a customer may interact with the picker client device 110, one or more of the retailer computing systems 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a list of products to be delivered to the customer. A "product," as used herein, means a good or item that can be provided to the customer through the online concierge system 140 (e.g., physical product). The order may include product identifiers (e.g., SKU, retailer reference code (RRC)) for products to be delivered to the user and may include quantities of the products to be delivered. Additionally, an order may further include a delivery location to which the ordered products are to be delivered and a timeframe during which the products should be delivered. In some embodiments, the order also specifies one or more retailers from which the ordered products should be collected.

The customer client device 100 may provide an ordering user interface to the customer that the customer can use to place an order with the online concierge system 140. The ordering user interface may be part of a client application operating on the customer client device 100. The ordering user interface may allow the customer to search for products that are available through the online concierge system 140 and the user can select which products to add to an order. The customer client device 100 may receive additional content from the online concierge system 140 to present to a customer. For example, the customer client device 100 may present coupons, recipes, product suggestions, or offers to customers.

The picker client device 110 is a client device through which a picker may interact with the customer client device 100, one or more of the retailer computing systems 120, or the online concierge system 140. The picker device 100 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the products listed in the order from a retailer. The picker client device 110 presents the products that are included in the customer's order to the picker. The picker collects the products from the retailer and delivers the products to the customer at the delivery location provided by the customer in the order. In some embodiments, the picker client device 110 provides multiple orders from to a picker for the picker to service at the same time from the same retailer.

The picker client device 110 may instruct a picker on where to deliver the products for a customer's order. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer from which the picker collected the products to the one or more delivery locations.

In some embodiments, the picker is a single person who collects products for an order from a retailer and delivers the order to the delivery location for the order. Alternatively, more than one person may serve the role as a picker for an order. For example, multiple people may collect the products at the retailer for a single order. Similarly, the person who delivers an order to its delivery location may be different from the person or people who collected the products from the retailer. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect products in a retailer for an order and an autonomous vehicle may deliver an order to a customer from a retailer.

Each of the retailer computing systems 120 is a computing system operated by a retailer or by a particular location of a retailer chain that interacts with the online concierge system 140. Each retailer computing system 120 may include an inventory data transmission module 122 (e.g., 122a, . . . , 122n) that stores and provides product data to the online concierge system 140 (e.g., in the form of a plurality of product data entries). Each inventory data transmission module 122 may regularly update the online concierge system 140 with updated product data. For example, each inventory data transmission module 122 may provide the online concierge system 140 with updated product prices, sales, or availabilities. Additionally, each retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The online concierge system 140 is an online system by which customers can order products to be provided to them by a picker from a retailer (e.g., a particular location or store of a particular retailer). The online concierge system 140 receives orders from customer client devices 100 through the network 130. The online concierge system 140 selects a picker to service the customer's order and transmits the order to a picker client device 110 associated with the picker. The picker collects the ordered products from a retailer and delivers the ordered products to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The customer client device 100, the picker client device 110, the plurality of retailer computing systems 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

Figure 2:
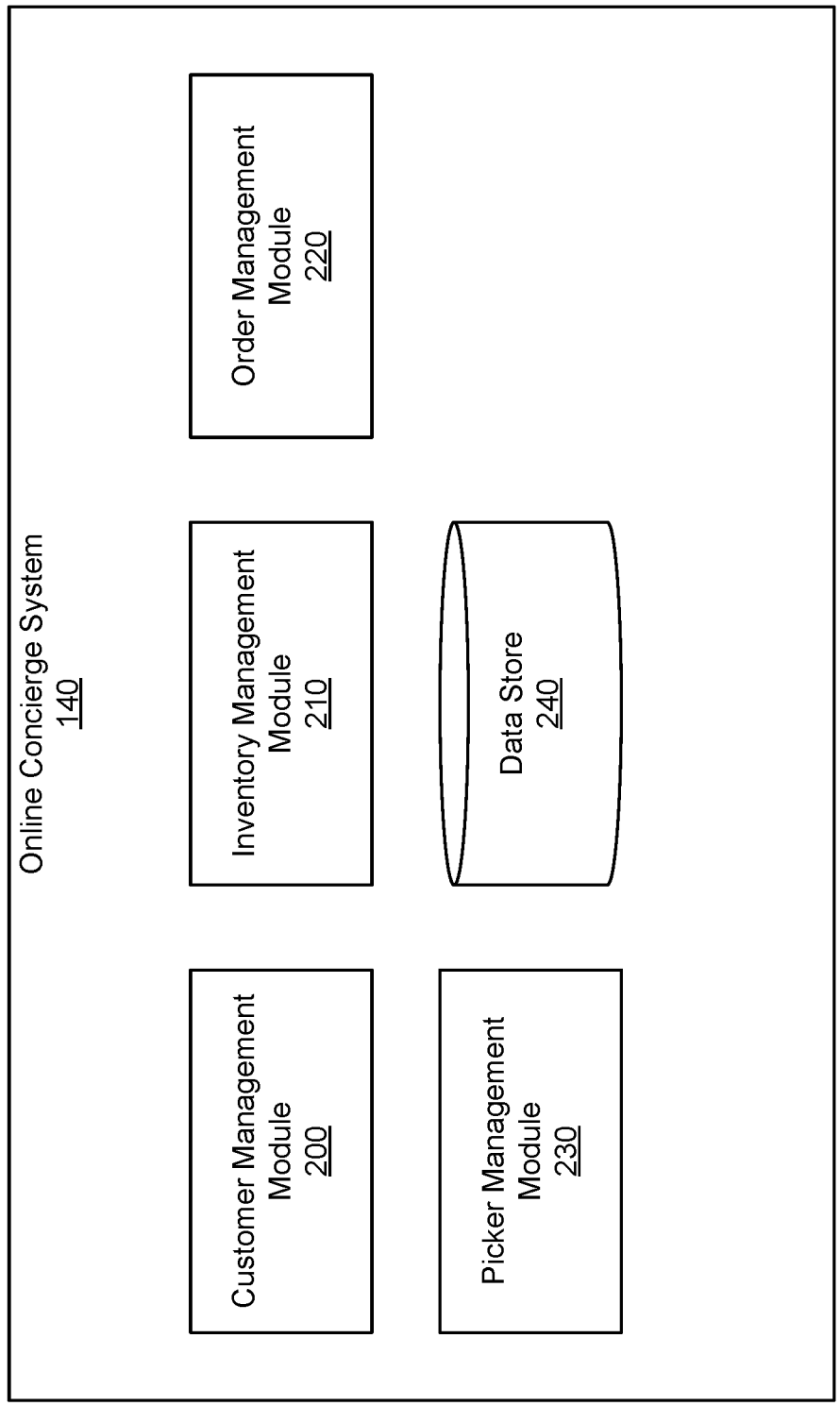
FIG. 2 illustrates an example system architecture for an online concierge system, in accordance with one or more illustrative embodiments.

FIG. 2 illustrates an example system architecture for an online concierge system 140, in accordance with one or more illustrative embodiments. The system architecture illustrated in FIG. 2 includes a customer management module 200, an inventory management module 210, an order management module 220, a picker management module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The customer management module 200 stores and manages customer data, which is information or data that describe characteristics of a customer. For example, customer data may include a customer's name, address, shopping preferences, favorite products, or stored payment instruments. The customer data also may include default settings established by the customer, such as a default retailer, payment instrument, delivery location, or delivery timeframe.

The online concierge system 140 includes an inventory management module 210 that manages the inventory of products available at retailers that provide products through the online concierge system 140. The inventory management module 210 requests, receives, and stores product data from retailer computing systems 120 operated by retailers. Product data (e.g., inventory data) is information or data that identifies and describes products (e.g., physical products) that are available at a retailer. The product data may include product identifiers (e.g., RRC, SKU) uniquely identifying the corresponding physical products that are available and may include quantities of products associated with each product identifier. Additionally, product data may also include descriptive data of the corresponding physical product. For example, the descriptive data may include a product title, attributes of the corresponding physical product such as the size, color, weight, stock keeping unit (SKU), or serial number for the product. The product data may further include purchasing rules associated with each product, if they exist. For example, age-restricted products such as alcohol and tobacco are flagged accordingly in the product data. Product data may also include information that is useful for predicting the availability of products in retailers. For example, for each product-retailer combination (a particular product at a particular warehouse), the product data may include a time that the product was last found, a time that the product was last not found (a picker looked for the product but could not find it), the rate at which the product is found, or the popularity of the product. The inventory management module 210 is described in further detail below in connection with FIG. 3.

The online concierge system 140 also includes an order management module 220 that manages orders for products from customers. For example, the order management module 220 transmits instructions to each customer client device 100 to display an ordering interface to each customer and receives order data from each customer client device 100 describing the order. Order data for an order is information or data that describes the order. For example, order data may include product data for products that are included in the order, a delivery location for the order, a customer associated with the order, a retailer from which the customer wants the ordered products collected, or a timeframe within which the customer wants the order delivered. Order data may further include information describing how the order was serviced, such as which picker serviced the order, when the order was delivered, or a rating that the customer gave the delivery of the order. The order management module 220 also facilitates any transaction associated with each order. For example, the order management module 220 may charge a payment instrument associated with a customer that placed an order. The order management module 220 may transmit payment information to a retailer computing system 120 to facilitate payment to the retailer computing system 120 for the order.

In some embodiments, the order management module 220 receives a query comprising one or more terms from the customer client device 100 and transmits product data describing products that satisfy the query. In some embodiments, the order management module 220 uses product embeddings for products to identify products based on a received query. For example, the order management module 220 may generate an embedding for a query and determines measures of similarity between the embedding for the query and product embeddings for various products included in the inventory management module 210. The order management module 220 provides the product data describing the identified products to the customer client device 100 for presentation to the customer. In some embodiments, the order management module 220 also shares order details with the retailer computing systems 120. For example, after successful fulfillment of an order, the order management module 220 may transmit order data for the order to the appropriate retailer computing systems 120.

The picker management module 230 assigns pickers to orders. The picker management module 230 receives a new order from the order management module 220 and identifies a picker to fulfill the order based on picker data describing characteristics of pickers. The picker data for a picker may include the picker's location, the picker's proximity to the retailer or the delivery location, how often the picker has serviced orders from that particular retailer, the picker's name, the picker's gender, a customer rating for the picker, or the picker's previous shopping history. The picker management module 230 may transmit instructions to a picker client device 110 for the picker on how the picker can travel from the picker's current location to the location of a retailer at which the order is to be fulfilled. The picker management module 230 monitors the status of the picker and determines when the picker has arrived at the retailer. The picker management module 230 also receives information from the picker client device 110 indicating when the picker has collected a product for an order. If the picker is fulfilling more than one order at the same time, the information may also include an indication of which order the collected product is for. The picker management module 230 may receive an indication from the picker client device 110 when the picker has collected all of the products for an order and may notify the customer through the customer client device 100. Additionally, the picker management module 230 may provide directions to the picker through the picker client device 110 from the retailer to the delivery location for each order that the picker has been assigned. The picker management module 230 may continue to monitor the status and location of the picker and provide information on the status of the picker to the customer as the picker travels to the delivery location.

In some embodiments, the picker management module 230 facilitates communication between the customer client device 100 and the picker client device 110. A customer may use a customer client device 100 to send a message to the picker client device 110. The picker management module 230 receives the message from the customer client device 100 and transmits the message to the picker client device 110 for presentation to the picker. The picker may use the picker client device 110 to send a message to the customer client device 100 in a similar manner.

The data store 240 stores data used by the online concierge system 140. For example, the data store 240 stores customer data, product data, order data, and picker data for use by the online concierge system 140. The data store 240 receives data from other modules in the online concierge system 140 or from the customer client device 100, the picker client device 110, or the retailer computing systems 120.

Figures 3, 4:
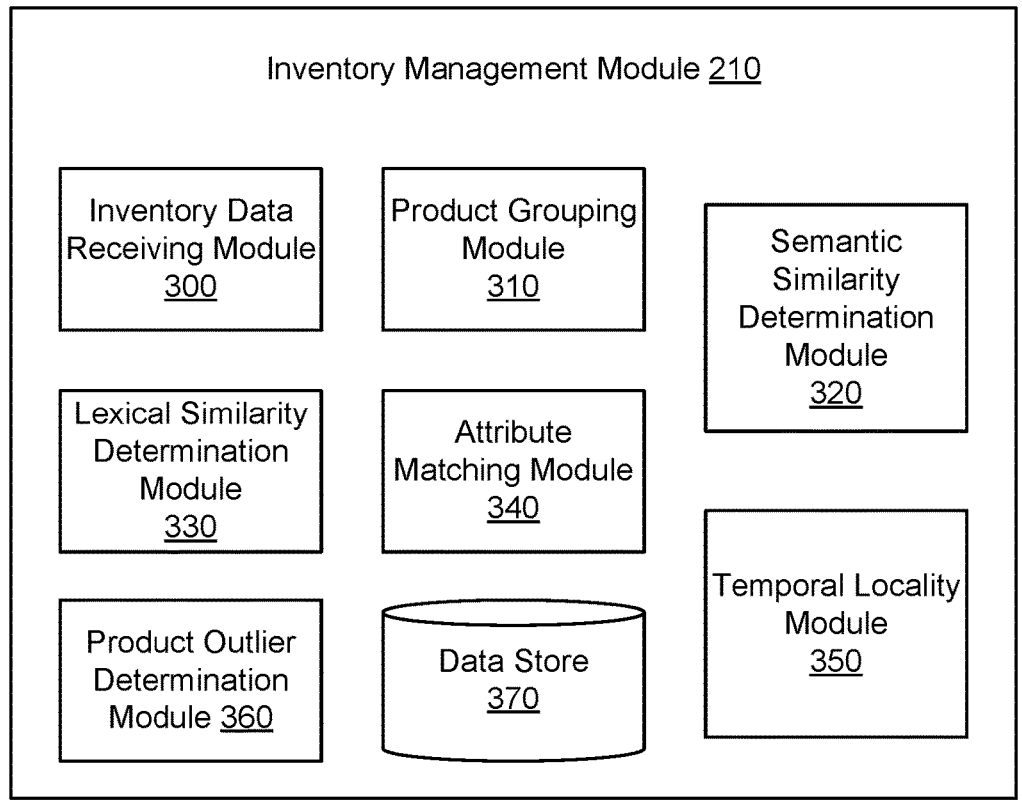
FIG. 3 is a block diagram of an inventory management module of the online concierge system of FIG. 2, in accordance with one or more illustrative embodiments.
FIG. 4 illustrates sample data entries having a same product identifier, in accordance with one or more illustrative embodiments.

FIG. 3 is a block diagram of the inventory management module of the online concierge system of FIG. 2, in accordance with one or more illustrative embodiments. The block diagram of the inventory management module 210 illustrated in FIG. 3 includes an inventory data receiving module 300, a product grouping module 310, a semantic similarity determination module 320, a lexical similarity determination module 330, an attribute matching module 340, a temporal locality module 350, a product outlier determination module 360, and a data store 370. Alternative embodiments may include more, fewer, or different components from those illustrated in FIG. 3, and the functionality of each component may be divided between the components differently from the description below. Additionally, each component may perform their respective functionalities in response to a request from a human, or automatically without human intervention.

The inventory data receiving module 300 is configured to receive product data (e.g., in the form of a plurality of product data entries) from the plurality of retailer computing systems 120. For example, the inventory data receiving module 300 may regularly receive (e.g., every night) product inventory data from each retailer computing system 120 indicating updated product prices, sales, or availabilities. The product data may be received in the form of an inventory file including a plurality of product data entries from each of the plurality of retailer computing systems 120 (e.g., from each store or warehouse of a retail chain), each product data entry comprising a product identifier uniquely identifying a corresponding physical product and descriptive data of the corresponding physical product. The product identifier may be a unique code (e.g., RRC, UPC) used by retailers as a unique identifier to identify each product. The descriptive data may include a product title (e.g., product name) and one or more product attributes of the corresponding physical product. That is, each product data entry in the inventory file (e.g., row of data in a database) may be associated with some text (e.g., product title) and possibly a few explicit attributes (e.g., brand, size, etc.). The associated attributes can be arbitrary and not every product entry may include all attributes or the same number of attributes. The product data entry including the product identifier and corresponding descriptive data is explained in further detail below in connection with FIG. 4.

The product grouping module 310 is configured to group the product data (e.g., corresponding to multiple inventory files) received by the inventory data receiving module 300 into a plurality of groups based on the product identifier. That is, the product grouping module 310 determines a subset of the plurality of product data entries, that are received in the plurality of inventory files from the plurality of retailer computing systems 120, and that have a same product identifier. For example, the inventory data receiving module 300 may store the plurality of product data entries received in the plurality of inventory files in one or more product inventory databases in data store 370 and product grouping module 310 may access the databases to determine data entries that have the same product identifier (e.g., same RRC code).

A same product identifier is supposed to be associated with the same entity (i.e., same physical product). Hence, grouping the product data based on the same product identifier can allow the inventory management module 210 to find errors in the product-identifier-to-physical-product association. For example, a particular inventory file received from a particular store may associate the wrong RRC code for a given physical product due to a data entry error, while multiple other inventory files received from multiple other stores may associate a different (correct) RRC code for the given physical product. In this case, by grouping the product data entries based on the RRC code, the outlier data entry having the wrong RRC code can be identified, and appropriate action can be taken (e.g., notify the store, notify another user, autocorrect the RRC code for the outlier, and the like) automatically by the inventory management module 210. The data entry error can range from two completely different products being associated with the same product identifier (e.g., Pepsi vs Canned beans) to products with only different attribute(s) being associated with the same product identifier (e.g., 6-pack of a particular brand and type of beer vs. 12-pack of the same).

In order to identify the outlier in a subset of product data entries, the inventory management module 210 may calculate a plurality of similarity metrics or scores. The metrics may include a semantic similarity metric calculated by the semantic similarity determination module 320, a lexical similarity metric computed by the lexical similarity determination module 330, a product attribute similarity metric computed by the attribute matching module 340, and a temporal localization score computed by the temporal localization module 350.

The semantic similarity determination module 320 is configured to perform a pairwise comparison of an embedding vector representative of a product data entry in the subset with each of respective embedding vectors representative of other product data entries in the subset other than the product data entry. Based on the pairwise comparisons, the semantic similarity determination module 320 may compute respective vector similarity metrics between the embedding vector representative of the product data entry and each of the respective embedding vectors representative of the other product data entries. And based on the computed respective vector similarity metrics, the semantic similarity determination module 320 may determine a pooled semantic similarity metric for the product data entry (e.g., normalized value between 0 and 1 with a threshold indicating a cut-off for detecting the product data entry as an outlier in the subset or group).

To compute semantic similarity between two product data entries, the semantic similarity determination module 320 may utilize transformer-based machine learning techniques for natural language processing (NLP) such as bidirectional encoder representations from transformers (BERT). Pretrained language models such as BERT can be utilized to get embeddings from the descriptive data of the corresponding physical product in the product data entry and the embedding vector (e.g., latent space embedding vector) associated with the product data entry is compared with the embedding vector associated with another product data entry of the group to compute the vector similarity metric. In some embodiments, the language model may be configured to obtain a set of embedding vectors (multi-view embeddings) representative of the descriptive data of the product data entry, and the semantic similarity determination module 320 may compare the set of embedding vectors associated with the product data entry with the set of embedding vectors associated with another product data entry of the group to compute the vector similarity metric between the two data entries of the group. Different statistical methods can be used to find the similarity between two embedding vectors. In some embodiments, the similarity between two embedding vectors can be found using cosine similarity or dot products. Other embodiments may employ other statistical techniques to compute the similarity metrics based on the language model being used to get the embeddings from the descriptive data.

In some embodiments, for each data entry, the descriptive data based on which the one or more embedding vectors are obtained may correspond to a product sentence. The product sentence may be a concatenation of the product title (e.g., product name) and other provided information (e.g., one or more attributes) included in the data entry other than the product identifier. In some embodiments, the language model being used to get the embeddings from the descriptive data may be a multilingual language model. In this case, the embedding vectors will account for a situation where the descriptive data of two product data entries of the same group is in different languages but is otherwise the same. Thus, for example, the semantic similarity determination module 320 will compute the vector similarity metric indicating a high similarity score between a first product sentence "luxe lipstick" of a first data entry of a group and a second product sentence "rouge lvres de luxe" of a second data entry of the same group, since the first and second product sentences are in different languages (English and French) but otherwise have the same meaning. The model used by the semantic similarity determination module 320 may similarly be able to handle descriptive data describing products in different metric systems (e.g., milliliters vs. ounces) and assign high similarity scores if the difference is merely in the metric system used in describing the product. As another example, the model may also be able to handle abbreviations (e.g., assigning high similarity score when comparing two products described respectively as "wheat thin sundried tomato basil" and "wht thn sndrd tm bsl").

In some embodiments, the semantic similarity determination module 320 may further utilize a product-attribute prediction model to obtain a dense embedding vector representative of the product data entry. The dense embedding vector may represent probabilities of the physical product corresponding to the product data entry belonging to each of a plurality of predetermined product categories. The semantic similarity determination module 320 may then further compare the dense embedding vector associated with the product data entry with the dense embedding vector associated with another product data entry of the group to compute the vector similarity metric between the two data entries of the group. For example, a model may predict product categories using each the concatenated product sentence for the respective product data entries. In a case where there are 'k' product categories, and the model may predict the probability of the input data entry's corresponding physical product as belonging to each of the 'k' categories. The semantic similarity determination module 320 may then concatenate these 'k' probabilities as a dense embedding vector and use that to compare the semantic similarities of two products.

The lexical similarity determination module 330 is configured to perform a pairwise comparison of a character string representative of the product data entry (e.g., representative of the descriptive data of the product data entry) in the subset with each of respective character strings representative of the other product data entries in the subset. Based on each pairwise comparison, the lexical similarity determination module 330 may determine a custom edit distance representing a number of deletion and substitution operations required to transform the character string representative of one product data entry of the subset into the character string representative of another other product data entry in the subset. And based on the determined respective custom edit distances, the lexical similarity determination module 330 may determine a pooled lexical similarity metric for the one product data entry (e.g., normalized value between 0 and 1 with a threshold indicating a cut-off for detecting the product data entry as an outlier in the subset or group).

To compute the lexical similarity (or distance), the lexical similarity determination module 330 may use edit-distance between descriptive data (e.g., product titles or product names) of a pair of product data entries. The edit distance is a way of quantifying how dissimilar two character strings (e.g., words) are to one another by counting the minimum number of operations required to transform one string into the other. Different definitions of an edit distance use different sets of string operations. For example, Levenshtein distance operations are the deletion, insertion, or substitution of a character in the string. Being the most common metric, the term Levenshtein distance is often used interchangeably with edit distance. For example, as illustrated below, there are 5 operations required to transform a character string 'intention' to 'execution', so the Levenshtein distance equals 5.

INTE*NTION
*EXECUTION

In the above transformation, the 5 operations are: (1) deletion operation for deleting "I", (2) substitution operation for substituting "N" with "E", (3) substitution operation for substituting "T" with "X", (4) insertion operation for inserting "C", and (5) substitution operation for substituting "N" with "U."

However, the Levenshtein distance is not suitable because the descriptive data according to the present disclosure can be of variable length due to the presence/absence of the attributes, and the order can be arbitrary as well. For example, the Levenshtein distance between "pepsi cola 36 pk 12 oz" and "pepsi cola" is more than the edit distance between "pepsi" and "coke" (it should be less). As another example, the Levenshtein distance between "pepsi cola 36 pk 12 oz" and "36 pk 12 oz pepsi cola" is more than the edit distance between "pepsi" and "coke".

To overcome the above problem, the lexical similarity determination module 330 according to the present disclosure implements a custom definition of edit distance which requires that given a pair of strings s1 and s2, with length of s1<=s2, the custom edit distance should consider the deletion operations and substitution operations it takes to convert s1 to s2, and disregard insertion operations. Further, the lexical similarity determination module 330 according to the present disclosure defines the custom edit distance between s1 and s2 such that the distance metric is invariant to the ordering of the words in the string. That is, the custom edit distance is the minimum distance between the two strings s1 and s2 out of all the permutations of the words in the two strings. For example, to compute the custom edit distance between "pepsi cola 36" and "coca cola", the lexical similarity determination module 330 takes the minimum between the distances of ("pepsi cola 36", "coca cola"), ("pepsi 36 cola", "coca cola"), ("cola 36 pepsi", "coca cola"), ("cola pepsi 36", "coca cola"), ("36 pepsi cola", "coca cola"), ("36 cola pepsi", "coca cola"), ("pepsi cola 36", "cola coca"), ("pepsi 36 cola", "cola coca"), ("cola 36 pepsi", "cola coca"), ("cola pepsi 36", "cola coca"), ("36 pepsi cola", "cola coca"), ("36 cola pepsi", "cola coca").

In some embodiments, for computational simplicity, the lexical similarity determination module 330 may sort the words (e.g., in an alphabetical order) in the two character strings being compared prior to performing the pairwise comparison operation. In some embodiments, the lexical similarity determination module 330 may limit the custom edit distance to be calculated between the frequent words (e.g., frequency is decided through a threshold) of the product names. This may ensure that random words in the product names do not impact the calculated custom edit distance. For example, the custom edit distance between "pepsi cola" and "pepsi cola 12463565" would be 0 with this constraint. Further, to normalize the custom edit distance (e.g., to lie between 0-1) between two character strings of two product data entries of the same group, the lexical similarity determination module 330 may divide the computed edit distance by the length of the smaller string (e.g., smaller out of s1 and s2).

For each of the product data entries in the subset, the attribute matching module 340 is configured to predict one or more product attributes based on the corresponding descriptive data. The attribute matching module 340 may further be configured to pairwise compare the predicted one or more product attributes of the product data entry in the subset with each of respective predicted one or more product attributes of the other product data entries in the subset. Based on the pairwise comparisons, the attribute matching module 340 may compute respective product attribute similarity metrics between the predicted one or more product attributes of the product data entry with each of the respective predicted one or more product attributes of the other product data entries. And based on the based on the computed respective product attribute similarity metrics, the attribute matching module 340 may determine a pooled product attribute similarity metric for the product data entry (e.g., normalized value between 0 and 1 with a threshold indicating a cut-off for detecting the product data entry as an outlier in the subset or group).

For example, the attribute prediction models discussed above in connection with the dense embedding vector obtained for the semantic similarity computation, may be utilized by the attribute matching module 340 to determine the product embeddings for the corresponding physical product of the product data entry. And the attribute matching module 340 may directly compare the one or more product attributes predicted by the attribute prediction models for two product data entries in the subset. To perform the predictions, the attribute matching module 340 may provide as input to the attribute prediction models, the descriptive data included in the product data entry. Further, the attribute matching module 340 may obtain and provide other data (e.g., image data not provided by the retailer computing devices 120) as input to the models, based on which the attribute predictions are made. For example, a brand detection model may be used to predict the brand of the product. If the attribute matching module 340 determines that the predicted brands of the two products match, then it is a positive signal. The same process may be performed for other attributes as well, such as size, flavor, dietary attributes, etc.

The temporal locality module 350 is configured to compute a temporal localization score of the product data entry in the subset. The temporal localization score may be determined based on a comparison of an update timestamp associated with the product data entry with respective update timestamps associated with the other product data entries in the subset. Like the other metrics computed by modules 320, 330, and 340, the temporal localization score determined by the temporal locality module 350 may be a normalized value between 0 and 1 with a threshold indicating a cut-off for detecting the product data entry as an outlier in the subset or group.

In determining an outlier based on the temporal localization score, it is expected that the potential outlier data entry sent by a retailer is localized with respect to time. That is, it is not sent regularly (since the error may be noticed by the retailer and corrected in subsequent transmissions of inventory files). Thus, the temporal locality module 350 may be employed to add an additional constraint based on the time that has elapsed since the data entry in question was received by the inventory data receiving module 300 (e.g., older timestamp indicating a higher likelihood of the entry being an outlier). Such filtering may particularly help in increasing the precision of the output. For example, if the two product data entries mapped to the same RRC differ in just the language (e.g., English vs French) it is expected that the retailer would continuously or regularly send the data for the product names in both languages. However, if a given entry was sent only once some time ago, and other entries in the group have more recent time stamps, it may indicate that the error associated with the given entry was subsequently corrected.

The product outlier determination module 360 may be configured for determining whether a current product data entry is an outlier in the subset based on one or more of the metrics computed by the semantic similarity determination module 320, the lexical similarity determination module 330, the attribute matching module 340, and the temporal locality module 350. In some embodiments, metric computation by the semantic similarity determination module 320, the lexical similarity determination module 330, the attribute matching module 340, and the temporal locality module 350 may be performed in a predetermined order. In other embodiments, it may be performed in parallel. In yet other embodiments, metric computation by one or more of the semantic similarity determination module 320, the lexical similarity determination module 330, the attribute matching module 340, and the temporal locality module 350 may be performed based on the metric computation by another one or more of the semantic similarity determination module 320, the lexical similarity determination module 330, the attribute matching module 340, and the temporal locality module 350. For example, first, the inventory management module 210 may compute the pooled lexical similarity metric for a data entry in a group based on the lexical similarity determination module 320, and if it is determined that the data entry is an outlier, additional similarity metrics (e.g., the pooled semantic similarity metric) may be computed to verify the outlier determination based on the pooled lexical similarity metric. For example, the additional similarity metrics may not be computed if the data entry is determined not to be an outlier based on the pooled lexical similarity metric.

Based on the determination, the product outlier determination module 360 may further be configured to take one or more actions. For example, the product outlier determination module 360 may be configured to transmit a notification to a client device of a user in response to determining that the product data entry is the outlier. As another example, the product outlier determination module 360 may be configured to determine what the correct product identifier should be for the outlier data entry (e.g., determine based on the other data entries of the same subset or group, based on running a search on the descriptive data associated with the current product data entry, based on a user input or confirmation, and the like), and automatically updating the product identifier based on the correct product identifier based on the determination. In this case, the product outlier determination module 360 may further be configured to notify the retailer (e.g., the retailer computing device 120 corresponding to the current product data entry) of the correction to the product identifier and requesting the retailer to update the product-identifier-to-physical-product association for the current product data entry thus ensuring accuracy of the data entry for further processing.

As yet another example, in response to determining that the product data entry is the outlier, the product outlier determination module 360 may be configured to send one or more commands directing the client device to display the notification, where the commands cause the client device to display the notification on a display device. Additionally (or in the alternative), in response to determining that the product data entry is the outlier, the product outlier determination module 360 may be configured to modify the product identifier in a stored database and send updated data back to the retailer computing device 120 corresponding to the current product data entry. For example, the product outlier determination module 360 may be configured to trigger a workflow for a user to update the product information of the affected product data entry. Based on determining that the product data entry is the outlier, the inventory management module 210 may perform one or more additional actions like triggering a request for user input, causing a different product to be added to a shopping cart, causing a product to be removed from the shopping cart, causing a different product to be ordered, updating an interface based on an action, causing a product corresponding to the outlier to be ordered, and the like.

The data store 370 stores data used by the inventory management module 210. For example, the data store 370 stores the inventory data received by the inventory data receiving module 300, the data corresponding to the data entries divided into groups by the product grouping module 310, the computed metric data and corresponding models and logic used for the computations by the semantic similarity determination module 320, the lexical similarity determination module 330, the attribute matching module 340, and the temporal locality module 350, and the threshold data and data for implementing the logic and features of the product outlier determination module 360. The data store 370 receives data from and transmits data to other modules in the inventory management module 210, the online concierge system 140 or from the customer client device 100, the picker client device 110, or the retailer computing systems 120.

FIG. 4 illustrates sample data entries having a same product identifier, in accordance with one or more illustrative embodiments. As shown in FIG. 4, product data 400 may include a plurality of product data entries 450 (450a, 450b, 450c), each data entry including a product identifier (e.g., RRC 405) and descriptive data (e.g., product title 410, and product attributes 415 (e.g., brand 415a, size 415b, quantity 415n)). In the example shown in FIG. 4, the product identifier is illustrated to be an RRC code. In other embodiments, the product identifier may be some other type of identifier that is used to uniquely identify different products (e.g., UPC code). Further, in the example shown in FIG. 4, the product grouping module 310 has identified product data entries 450 that belong to the same group based on matching RRC 405 (i.e., XYZ123456). While only three data entries are shown in FIG. 4, each group or subset may include a large number of data entries 450. Since data entries 450 have the same product identifier 405, the descriptive data (410, 415) corresponding to the data entries 450 should have a high degree of similarity (i.e., the entries are supposed to be about the same entity, e.g., the entity can be a 36 pack of 12 oz Pepsi cans). And using the techniques disclosed above in connection with FIG. 3, product outlier determination module 360 can determine whether one of data entries 450a, 450b, and 450c is an outlier data entry.

By using the techniques described above in connection with the modules 320-350, the product outlier determination module 360 may determine that the data entries 450a and 450b have a high similarity (e.g., the language model may assign similar embedding vectors (or similar dense embedding vectors) to "pepsi 12 oz" and "pepsi 355 ml"), and further determine that the data entries 450a and 450c (and 450b and 450c) have a low similarity. Thus, in this case, the module 360 may determine that the data entry 450c is an outlier, and may perform one or more based on the determination.

Figure 5:
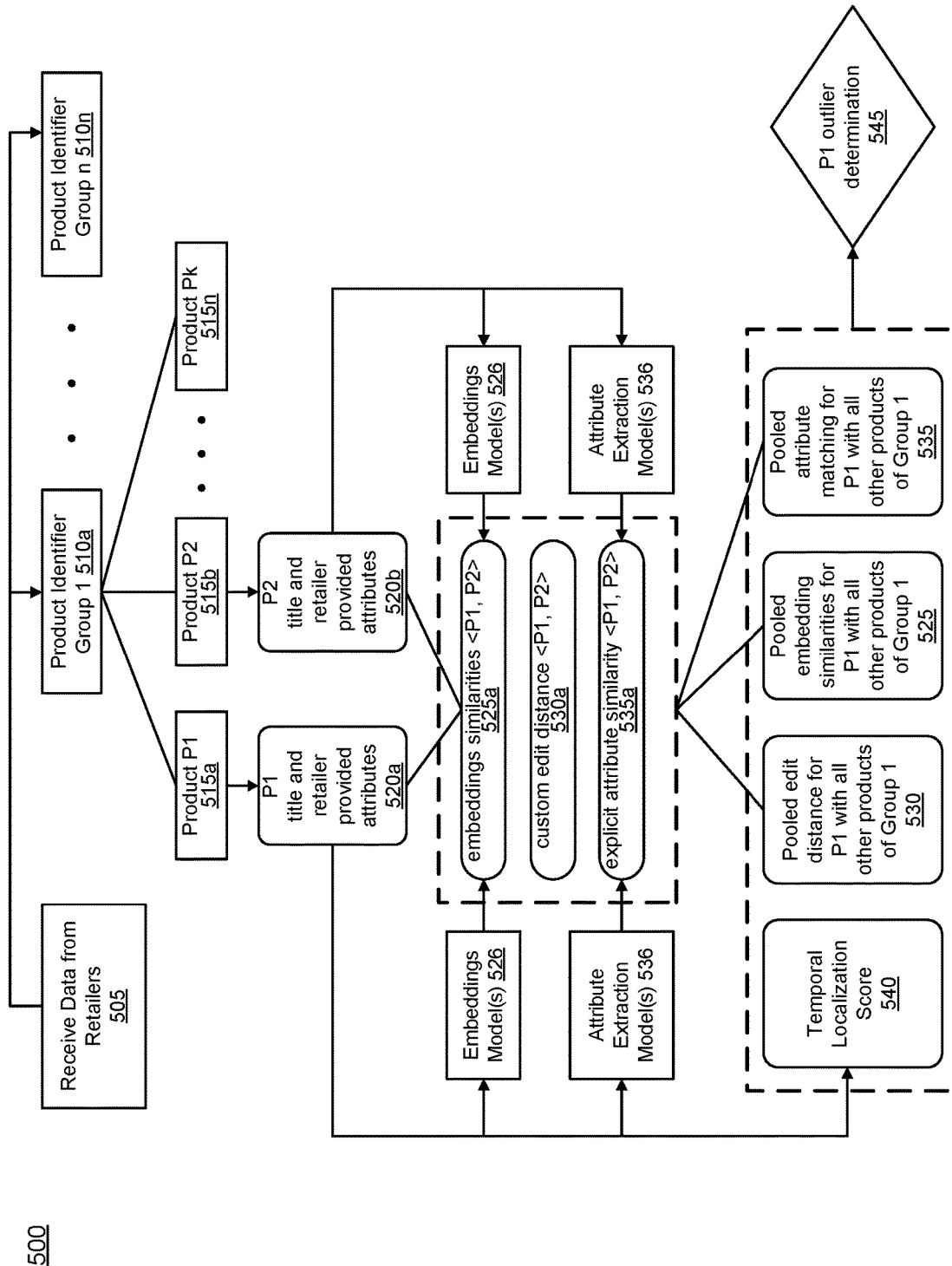
FIG. 5 illustrates a process for determining whether a particular product data entry is an outlier from among a plurality of data entries belonging to the same group, in accordance with one or more illustrative embodiments.

FIG. 5 illustrates a process 500 for determining whether a particular product data entry is an outlier from among a plurality of data entries belonging to the same group, in accordance with one or more illustrative embodiments. Alternative embodiments may include more, fewer, or different steps from those illustrated in FIG. 5, and the steps may be performed in a different order from that illustrated in FIG. 5. These steps may be performed by an inventory management module (e.g., the inventory management module 210). Additionally, each of these steps may be performed automatically by the module without human intervention.

The inventory data receiving module 300 may receive 505 product data (e.g., data similar to that shown in FIG. 4 but for a plurality of different RRCs 405) from a plurality of retailers (e.g., multiple stores or warehouses of a retail chain). The product grouping module 310 may group the product data received at block 505 into a plurality of groups (e.g., 510a, . . . , 510n) based on the product identifier included in each product data entry, each group including a plurality of data entries (e.g., 515a, 515a, . . . , 515n), and each data entry (e.g., 515a, 515a, . . . 515n) including corresponding descriptive data 520 (e.g., 520a, 520b) describing the corresponding physical product. As shown in FIG. 5, for each group 510 that includes a plurality of product data entries 515, the semantic similarity determination module 320 performs the above described pairwise comparison operation (e.g., compare P1 with P2, . . . , compare P1 with Pk) to compute respective embedding similarities 525 (e.g., 525a) using one or more embedding models 526. Further, the lexical similarity determination module 330 performs the above described pairwise comparison operation (e.g., compare P1 with P2, . . . , compare P1 with Pk) to compute respective custom edit distances 530 (e.g., 530a). Still further, the attribute matching module 340 performs the above described pairwise comparison operation (e.g., compare P1 with P2, . . . , compare P1 with Pk) to compute respective explicit attribute similarities 535 (e.g., 535a) using one or more attribute extraction models 536.

Based on the respective computed embedding similarities 525 (e.g., 525a), the semantic similarity determination module 320 may further compute a pooled embedding similarity for the data entry 515A (product P1) with all other products of the group 510a. Further, based on the respective computed custom edit distances 530 (e.g., 530a), the lexical similarity determination module 330 may further compute a pooled custom edit distance or lexical similarity for the data entry 515A (product P1) with all other products of the group 510a. And still further, based on the respective computed explicit attribute similarities 535 (e.g., 535a), the attribute matching module 340 may further compute a pooled attribute matching for the data entry 515A (product P1) with all other products of the group 510a. Still further, temporal locality module 350 may compute the temporal localization score 540 for data entry 515a. Each pooling operation may involve obtaining the minimum or average of the corresponding computed metrics to come up with a global similarity score for the data entry 515a with all other data entries of the group 510a.

Product outlier determination module 360 may then determine 545 whether the data entry 515a is an outlier in the group 510a based on the computed temporal localization score 540 for the data entry 515a, the computed pooled edit distance 530 for the data entry 515a, the computed pooled embedding similarity 525 for the data entry 515a, and the computed pooled attribute matching 535 for the data entry 515a. For example, the product outlier determination module 360 may set (e.g., based on heuristics) one or more thresholds for one or more of the computed and pooled metrics or scores and further set corresponding logic to make the determination 545 regarding what constitutes as an outlier.

Figure 6:
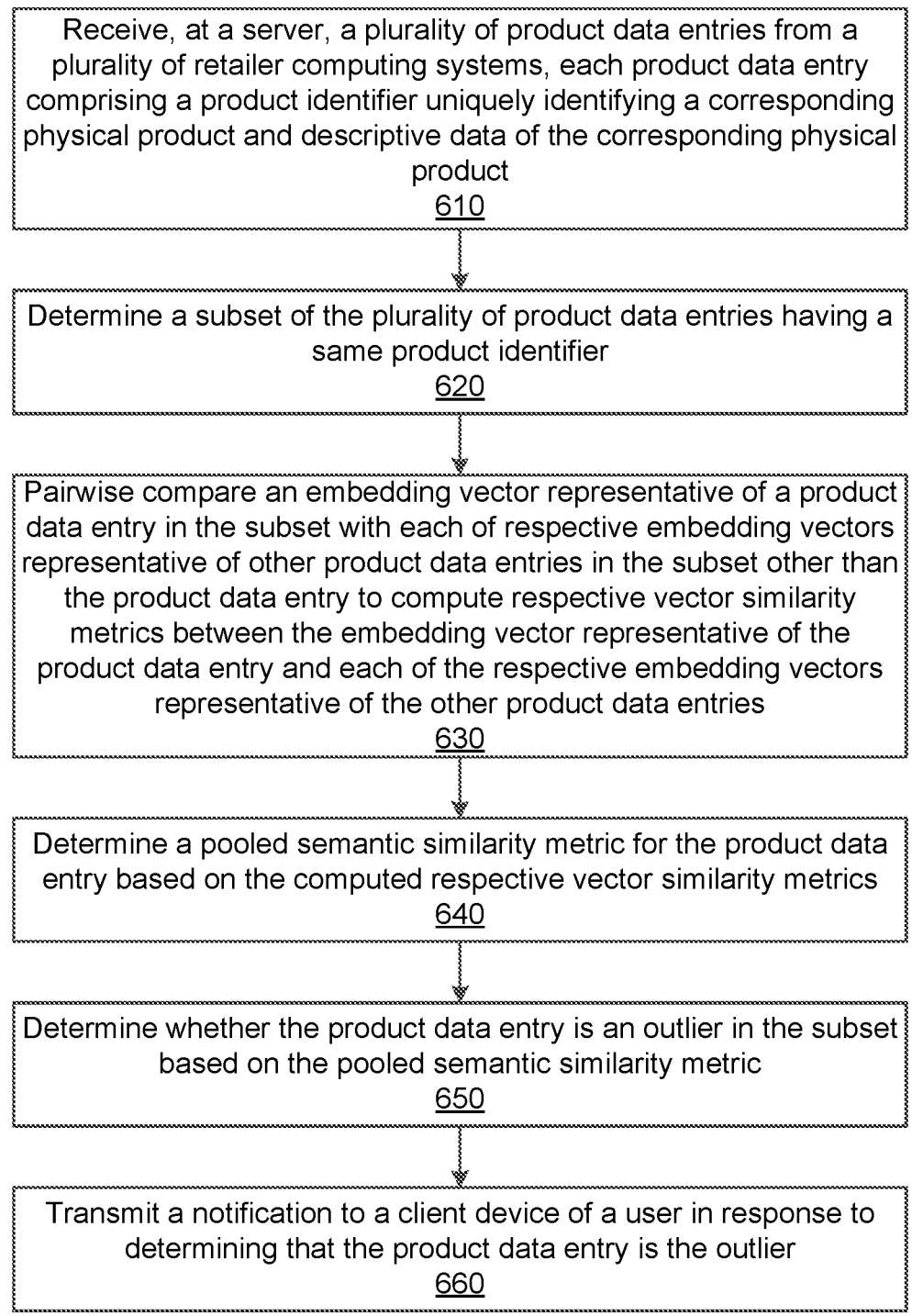
FIG. 6 is a flowchart of a method for determining whether a particular product data entry is an outlier from among a plurality of data entries belonging to the same group, in accordance with one or more illustrative embodiments.

FIG. 6 is a flowchart of a method 600 for determining whether a particular product data entry is an outlier from among a plurality of data entries belong to the same group, in accordance with one or more illustrative embodiments. Alternative embodiments may include more, fewer, or different steps from those illustrated in FIG. 6, and the steps may be performed in a different order from that illustrated in FIG. 6. These steps may be performed by an inventory management module (e.g., the inventory management module 210). Additionally, each of these steps may be performed automatically by the module without human intervention.

A server (e.g., online concierge system 140, inventory data receiving module 300) may receive 610 a plurality of product data entries (e.g., from a plurality of retailer computing systems (e.g., retailer computing systems 120), each product data entry comprising a product identifier (e.g., RRC 405) uniquely identifying a corresponding physical product and descriptive data (e.g., product title 410, product attributes 415) of the corresponding physical product.

The product grouping module 310 may determine 620 a subset (e.g., 510a) of the plurality of product data entries having a same product identifier. The semantic similarity determination module 320 may pairwise compare 630 an embedding vector representative of a product data entry (e.g., 515a) in the subset (e.g., 510a) with each of respective embedding vectors representative of other product data entries (e.g., 515b, . . . , 515n) in the subset other than the product data entry to compute respective vector similarity metrics (e.g., 525a) between the embedding vector representative of the product data entry and each of the respective embedding vectors representative of the other product data entries.

The semantic similarity determination module 320 may determine 640 a pooled semantic similarity metric (e.g., 525) for the product data entry based on the computed respective vector similarity metrics. The product outlier determination module 360 may determine 650 whether the product data entry (e.g., 515a) is an outlier in the subset (e.g., 510a) based on the pooled semantic similarity metric (e.g., 525). And the product outlier determination module 360 may transmit 660 a notification to a client device (e.g., retailer computing system 120a) of a user in response to determining that the product data entry is the outlier.

Figure 7:
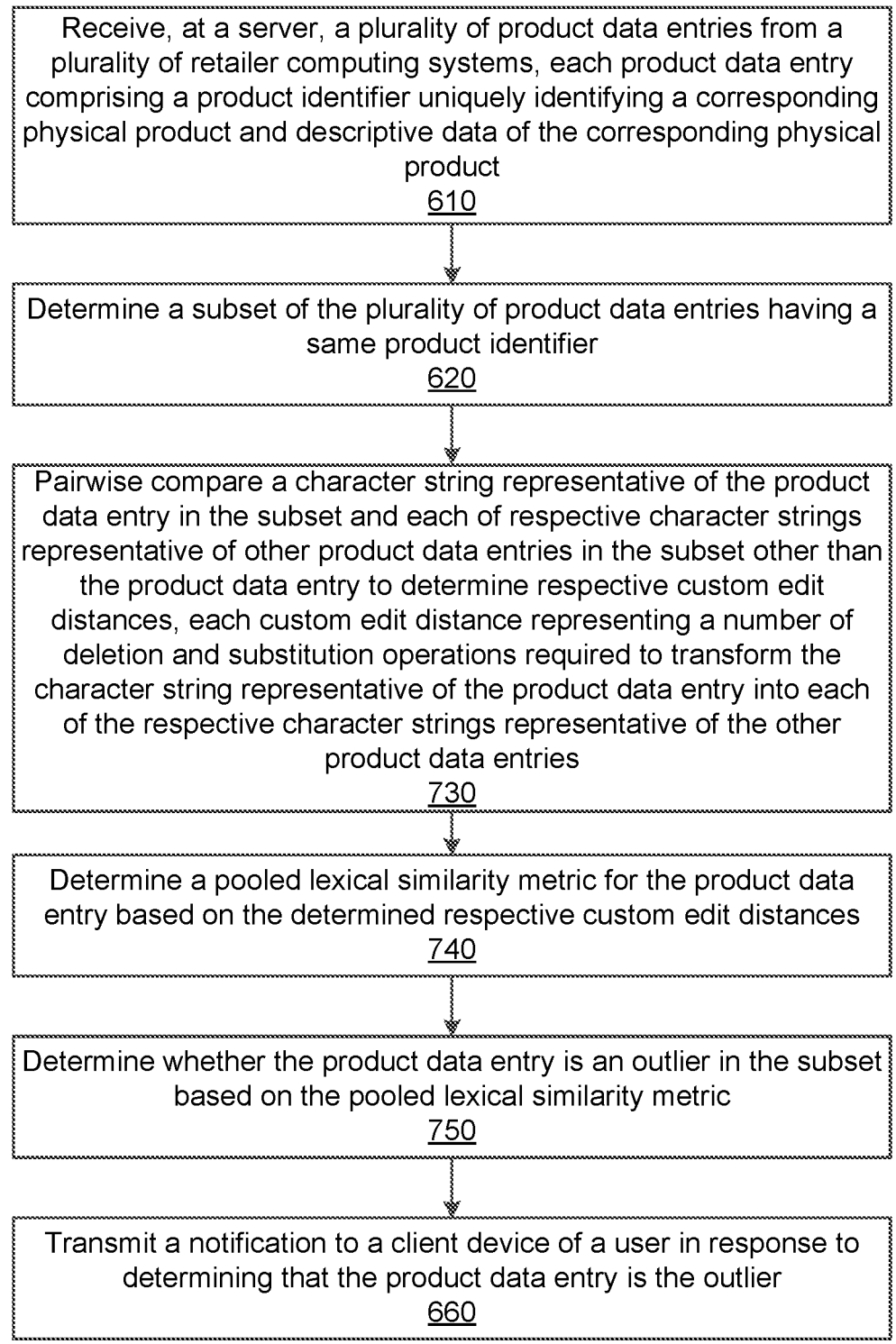
FIG. 7 is a flowchart of another method for determining whether a particular product data entry is an outlier from among a plurality of data entries belonging to the same group, in accordance with one or more illustrative embodiments.

FIG. 7 is a flowchart of a method 700 for determining whether a particular product data entry is an outlier from among a plurality of data entries belong to the same group, in accordance with one or more illustrative embodiments. Alternative embodiments may include more, fewer, or different steps from those illustrated in FIG. 7, and the steps may be performed in a different order from that illustrated in FIG. 7. These steps may be performed by an inventory management module (e.g., the inventory management module 210). Additionally, each of these steps may be performed automatically by the module without human intervention. In method 700, steps that are the same as those in method 600 of FIG. 6 are identified by the same reference numerals, and detailed description of these steps is omitted here.

The lexical similarity determination module 330 may pairwise compare 730 a character string representative of the product data entry (e.g., 515a) in the subset (e.g., 510a) and each of respective character strings representative of other product data entries (e.g., 515b, . . . , 515n) in the subset other than the product data entry to determine respective custom edit distances (e.g., 530a), each custom edit distance representing a number of deletion and substitution operations required to transform the character string representative of the product data entry into each of the respective character strings representative of the other product data entries.

The lexical similarity determination module 330 may determine 740 a pooled lexical similarity metric (e.g., 530) for the product data entry based on the determined respective custom edit distances. The product outlier determination module 360 may determine 750 whether the product data entry (e.g., 515a) is an outlier in the subset (e.g., 510a) based on the pooled lexical similarity metric (e.g., 530).

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A computer-implemented method comprising:
receiving, at a server, a plurality of product data entries from a plurality of retailer computing systems, each product data entry comprising a product identifier uniquely identifying a corresponding physical product and descriptive data of the corresponding physical product;
determining a subset of the plurality of product data entries having a same product identifier;
pairwise comparing an embedding vector representative of a product data entry in the subset with each of respective embedding vectors representative of other product data entries in the subset other than the product data entry to compute respective vector similarity metrics between the embedding vector representative of the product data entry and each of the respective embedding vectors representative of the other product data entries;
determining a pooled semantic similarity metric for the product data entry based on the computed respective vector similarity metrics;

determining whether the product data entry is an outlier in the subset based on the pooled semantic similarity metric; and transmitting a notification to a client device of a user in response to determining that the product data entry is the outlier.

2. The computer-implemented method of claim 1, wherein the descriptive data includes a product title and one or more product attributes of the corresponding physical product, and wherein each embedding vector is a set of embedding vectors representative of the product title and the one or more product attributes.

3. The computer-implemented method of claim 2, further comprising obtaining a dense embedding vector representative of the product data entry, the dense embedding vector representing probabilities of the physical product corresponding to the product data entry belonging to each of a plurality of predetermined product categories.

4. The computer-implemented method of claim 3, wherein the dense embedding vector is included in the set of embedding vectors, and wherein the computed respective vector similarity metrics are based on the set of embedding vectors representative of the product data entry and respective sets of embedding vectors representative of the other product data entries.

5. The computer-implemented method of claim 1, further comprising:
pairwise comparing a character string representative of the product data entry in the subset with each of respective character strings representative of the other product data entries in the subset to determine respective custom edit distances, each determined custom edit distance representing a number of deletion and substitution operations required to transform the character string representative of the product data entry into each of the respective character strings representative of the other product data entries; and
determining a pooled lexical similarity metric for the product data entry based on the determined respective custom edit distances,
wherein the product data entry is determined to be the outlier in the subset further based on the pooled lexical similarity metric.

6. The computer-implemented method of claim 5, further comprising sorting words in the character string and in each of the respective character strings prior to the pairwise comparison.

7. The computer-implemented method of claim 1, further comprising:
for each of the product data entries in the subset, predicting one or more product attributes based on the corresponding descriptive data;
pairwise comparing the predicted one or more product attributes of the product data entry in the subset with each of respective predicted one or more product attributes of the other product data entries in the subset to compute respective product attribute similarity metrics between the predicted one or more product attributes of the product data entry with each of the respective predicted one or more product attributes of the other product data entries; and
determining a pooled product attribute similarity metric for the product data entry based on the computed respective product attribute similarity metrics,
wherein the product data entry is determined to be the outlier in the subset further based on the pooled product attribute similarity metric.

8. The computer-implemented method of claim 7, wherein for each of the product data entries in the subset, the one or more product attributes are predicted based on the corresponding descriptive data, and further based on image data that is not included in the product data entry.

9. The computer-implemented method of claim 1, further comprising computing a temporal localization score of the product data entry in the subset, the temporal localization score being determined based on a comparison of an update timestamp associated with the product data entry with respective update timestamps associated with the other product data entries in the subset,
wherein the product data entry is determined to be the outlier in the subset further based on the temporal localization score.

10. The computer-implemented method of claim 1, further comprising, in response to determining that the product data entry is the outlier, triggering a workflow for a user to update the product data entry.

11. A computer-implemented method comprising:
receiving, at a server, a plurality of product data entries from a plurality of retailer computing systems, each product data entry comprising a product identifier uniquely identifying a corresponding physical product and descriptive data of the corresponding physical product;
determining a subset of the plurality of product data entries having a same product identifier;
pairwise comparing a character string representative of the product data entry in the subset and each of respective character strings representative of other product data entries in the subset other than the product data entry to determine respective custom edit distances, each custom edit distance representing a number of deletion and substitution operations required to transform the character string representative of the product data entry into each of the respective character strings representative of the other product data entries;
determining a pooled lexical similarity metric for the product data entry based on the determined respective custom edit distances;
determining whether the product data entry is an outlier in the subset based on the pooled lexical similarity metric; and
transmitting a notification to a client device of a user in response to determining that the product data entry is the outlier.

12. A non-transitory computer-readable storage medium comprising instructions that, when executed by a processor, cause the processor to:
receive, at a server, a plurality of product data entries from a plurality of retailer computing systems, each product data entry comprising a product identifier uniquely identifying a corresponding physical product and descriptive data of the corresponding physical product;
determine a subset of the plurality of product data entries having a same product identifier;
pairwise compare an embedding vector representative of a product data entry in the subset with each of respective embedding vectors representative of other product data entries in the subset other than the product data entry to compute respective vector similarity metrics between the embedding vector representative of the product data entry and each of the respective embedding vectors representative of the other product data entries;

determine a pooled semantic similarity metric for the product data entry based on the computed respective vector similarity metrics;

determine whether the product data entry is an outlier in the subset based on the pooled semantic similarity metric; and transmit a notification to a client device of a user in response to determining that the product data entry is the outlier.

13. The non-transitory computer readable storage medium of claim 12, wherein the descriptive data includes a product title and one or more product attributes of the corresponding physical product, and wherein each embedding vector is a set of embedding vectors representative of the product title and the one or more product attributes.

14. The non-transitory computer readable storage medium of claim 13, further comprising instructions that cause the processor to obtain a dense embedding vector representative of the product data entry, the dense embedding vector representing probabilities of the physical product corresponding to the product data entry belonging to each of a plurality of predetermined product categories.

15. The non-transitory computer readable storage medium of claim 14, wherein the dense embedding vector is included in the set of embedding vectors, and wherein the computed respective vector similarity metrics are based on the set of embedding vectors representative of the product data entry and respective sets of embedding vectors representative of the other product data entries.

16. The non-transitory computer readable storage medium of claim 12, further comprising instructions that cause the processor to:

pairwise compare a character string representative of the product data entry in the subset with each of respective character strings representative of the other product data entries in the subset to determine respective custom edit distances, each determined custom edit distance representing a number of deletion and substitution operations required to transform the character string representative of the product data entry into each of the respective character strings representative of the other product data entries; and determine a pooled lexical similarity metric for the product data entry based on the determined respective custom edit distances, wherein the product data entry is determined to be the outlier in the subset further based on the pooled lexical similarity metric.

17. The non-transitory computer readable storage medium of claim 16, further comprising instructions that cause the processor to sort words in the character string and in each of the respective character strings prior to the pairwise comparison.

18. The non-transitory computer readable storage medium of claim 12, further comprising instructions that cause the processor to:

for each of the product data entries in the subset, predict one or more product attributes based on the corresponding descriptive data;

pairwise compare the predicted one or more product attributes of the product data entry in the subset with each of respective predicted one or more product attributes of the other product data entries in the subset to compute respective product attribute similarity metrics between the predicted one or more product attributes of the product data entry with each of the respective predicted one or more product attributes of the other product data entries; and determine a pooled product attribute similarity metric for the product data entry based on the computed respective product attribute similarity metrics, wherein the product data entry is determined to be the outlier in the subset further based on the pooled product attribute similarity metric.

19. The non-transitory computer readable storage medium of claim 18, wherein for each of the product data entries in the subset, the one or more product attributes are predicted based on the corresponding descriptive data, and further based on image data that is not included in the product data entry.

20. The non-transitory computer readable storage medium of claim 12, further comprising instructions that cause the processor to compute a temporal localization score of the product data entry in the subset, the temporal localization score being determined based on a comparison of an update timestamp associated with the product data entry with respective update timestamps associated with the other product data entries in the subset, wherein the product data entry is determined to be the outlier in the subset further based on the temporal localization score.

21. The non-transitory computer readable storage medium of claim 12, further comprising instructions that cause the processor to, in response to determining that the product data entry is the outlier, trigger a workflow for a user to update the product data entry.

22. A non-transitory computer-readable storage medium comprising instructions that, when executed by a processor, cause the processor to:

receive, at a server, a plurality of product data entries from a plurality of retailer computing systems, each product data entry comprising a product identifier uniquely identifying a corresponding physical product and descriptive data of the corresponding physical product;

determine a subset of the plurality of product data entries having a same product identifier;

pairwise compare a character string representative of the product data entry in the subset and each of respective character strings representative of other product data entries in the subset other than the product data entry to determine respective custom edit distances, each custom edit distance representing a number of deletion and substitution operations required to transform the character string representative of the product data entry into each of the respective character strings representative of the other product data entries;

determine a pooled lexical similarity metric for the product data entry based on the determined respective custom edit distances;

determine whether the product data entry is an outlier in the subset based on the pooled lexical similarity metric; and transmit a notification to a client device of a user in response to determining that the product data entry is the outlier.

* * * * *